United States Patent [19]

Doroszkowski

[11] Patent Number: 4,512,861

[45] Date of Patent: Apr. 23, 1985

[54] ELECTROPHORETIC COATING PROCESS

[75] Inventor: Andrew Doroszkowski, Marlow, England

[73] Assignee: Imperial Chemical Industries PLC, London, England

[21] Appl. No.: 567,371

[22] Filed: Dec. 30, 1983

Related U.S. Application Data

[63] Continuation of Ser. No. 289,236, Aug. 3, 1981, abandoned, which is a continuation of Ser. No. 122,818, Feb. 19, 1980, abandoned.

[30] Foreign Application Priority Data

Feb. 27, 1979 [GB] United Kingdom ............... 7906828

[51] Int. Cl.$^3$ ............................................. C25D 13/10
[52] U.S. Cl. ................................................ 204/181 R
[58] Field of Search .................................... 204/181 R

[56] References Cited

U.S. PATENT DOCUMENTS 3,657,092  4/1972  Fischer et al. ............... 204/181 R

*Primary Examiner*—Howard S. Williams
*Assistant Examiner*—Terryence Chapman
*Attorney, Agent, or Firm*—Cushman, Darby & Cushman

[57] ABSTRACT

A coating process in which an article to be coated is immersed as an anode in a dispersion of a film-forming material stabilized by non-ionic stabilization and an electric current is passed between the anode and another electrode immersed in the dispersion. The dispersion is destabilized in the region of and is deposited on the anode by interaction between a moiety providing the non-ionic stabilization (e.g. of polyethylene glycol) and a further interactive moiety (e.g. carboxyl groups present in polymethacrylic acid) present in the dispersion. Suitable coating compositions and coated articles are defined.

8 Claims, No Drawings

ELECTROPHORETIC COATING PROCESS

This is a continuation, of application Ser. No. 289,236, filed Aug. 3, 1981, which in turn is a continuation of Ser. No. 122,818, filed Feb. 19, 1980, both now abandoned.

This invention relates to a coating process and to coating compositions useful in the process.

It is known that certain aqueous dispersions of film-forming materials which contain or are associated with ionisable groups can be employed to deposit a coating either at an anode or at a cathode in an electrical circuit when an electrical current is passed between suitable electrodes, as the anode and the cathode of the circuit, which are immersed in the dispersion. Usually the film-forming materials contain ionisable groups within their structure, for example carboxyl groups or amino groups, which are primarily responsible for the stability of the dispersion; but alternatively the ionisable groups may be present in an external surfactant which is associated with the film-forming material and which is present in order to stabilise the aqueous dispersion. Thus in each of these cases the stability of the dispersion is determined primarily by the presence of ionisable groups in their ionised form.

We have now found that certain aqueous dispersions of film-forming materials may be deposited as a coating at the anode of an electrical circuit when the film-forming material is stabilised in an aqueous medium by non-ionic stabilisation and does not contain any ionic charges or does not contain and/or is not associated with such a proportion of ionic charges as will determine primarily the stability of the dispersion.

According to this invention we provide a process of coating an electrically conductive substrate with a film-forming material wherein the substrate is immersed as an anode in a dispersion of the film-forming material in an aqueous medium and an electrical current is passed between the anodic substrate and a counter-electrode in electrical contact with the dispersion for a sufficient period of time to form a coating of desired thickness, characterised in that:

(a) the film-forming material is stabilised in the aqueous medium at a pH of greater than 3.9 by non-ionic stabilisation as herein defined, (b) the film-forming material is free from ionic charges or contains and/or is associated with only an amount of ionic charges such as will not alone primarily determine the stability of the dispersion, and (c) the dispersion also contains a chemical moiety, which is present in a further material constituent of the dispersion and/or in the film-forming material, which moiety is interactive with a hydrophilic non-ionic chemical moiety providing the non-ionic stabilisation of the dispersion of film-forming material, the interaction between the moieties causing destabilisation and flocculation or precipitation of the dispersed film-forming material at a pH of 3.9 or less as herein defined.

By a dispersion of film-forming material in aqueous medium we mean that the material can be present, for example, as a colloidal dispersion of solid or liquid particles, as a solution or as an aggregate or association of polymer molecules or a micellar solution or an emulsion.

By a film-forming material which is free from ionic charges or which contains and/or is associated with only an amount of ionic charges such as will not alone primarily determine the stability of the dispersion, we mean that these charges alone would not produce a stable dispersion of the film-forming material in the given aqueous medium at a pH of greater than 3.9 when the non-ionic stabilisation is absent. Conversely a stable dispersion for use in the invention would remain stable even in the absence of the ionic charges. We use the term 'stable dispersion' to mean that the dispersion must be sufficiently stable to enable its use as a coating composition in a coating process.

By non-ionic stabilisation of the film-forming material we mean that the stabilisation of the material in the given aqueous medium is primarily due to the presence of non-ionic surface-active constituents of the dispersion which comprise a non-ionic hydrophilic moiety. The non-ionic hydrophilic moiety may be present in the structure of the film-forming material and/or it may be present in a distinct surface-active constituent of the dispersion which is associated with the film-forming material. Preferably the hydrophilic non-ionic moiety is polymeric.

By an aqueous medium we mean water or a mixture of water and at least one other liquid miscible with water. Preferably there is present at least 20% by weight of water and more preferably at least 50% by weight of water. Suitable water-miscible liquids include alcohols, glycols, polyols and ketones. Inorganic salts may also be present in the aqueous medium.

The chemical moiety interactive with a hydrophilic non-ionic moiety providing the non-ionic stabilisation of the dispersion of the film-forming material, so as to cause destabilisation and flocculation or precipitation of the dispersed film-forming material at a pH of 3.9 or less, is preferably contained in a further material constituent of the aqueous dispersion. The further material constituent of the dispersant may be polymeric. Preferably the further material constituent is soluble in the aqueous medium. There may be present in the dispersion more than one dispersed film-forming material. In such a case one of the film-forming materials may contain a chemical moiety interactive with a hydrophilic non-ionic moiety contained in the other film-forming material, the stabilisation of the other dispersed film-forming material being provided by the hydrophilic non-ionic moiety.

Preferably the dispersed film-forming material stabilised by non-ionic stabilisation is associated with a plurality of non-ionic hydrophilic moieties. Preferably the further material constituent of the dispersion contains a plurality of chemical moieties interactive with the non-ionic hydrophilic groups associated with the film-forming material so as to cause destabilisation of the dispersion of film-forming material.

Whether or not a given dispersion of film-forming material, stabilised in the aqueous medium by non-ionic stabilisation and stable at a pH of greater than 3.9, and a given material constituent of the dispersion containing groups interactive with the hydrophilic non-ionic moieties (associated with the film-forming material) are a useful combination in the invention, can be determined as follows:

The selection of materials containing chemical moieties interactive with appropriate hydrophilic non-ionic moieties providing non-ionic stabilisation for the film-forming material are discussed below. To confirm the suitability and the proportion of a selected material there is first added to the dispersion of film-forming material, at a pH of greater than 3.9, quantities of the selected material to give compositions of desired concentration. The compositions are then titrated with dilute hydrochloric acid or other mineral acid to pH 2 and any composition that is flocculated or precipitated by the change in pH is suitable for use in this invention. When the interactive moieties are both contained in the film-forming material the titration is carried out on the dispersion alone. If the reduction of pH leads to destabilisation and flocculation or precipitation the dispersion contains sufficient interactive moieties for deposition by the method of the invention.

In order to ensure that any selected material containing chemical moieties interactive with the non-ionic hydrophilic moieties is not by itself destabilised and precipitated or flocculated under the process conditions, the above titration should also be carried out on an aqueous dispersion of that material at the same concentration as is to be used in the deposition process.

Although the stability of the dispersed film-forming material in aqueous medium at a pH of greater than 3.9 is due primarily to non-ionic stabilisation, the film-forming material and/or other constituents of the dispersion may contain a small proportion of ionic charges provided that this proportion does not primarily determine the stability of the dispersed constituents and does not interfere with non-ionic stabilisation. Thus the film-forming material may comprise, for example, a small proportion of ionisable groups such as carboxyl, sulphonic or sulphato groups. In general it is preferred, when there may be carboxyl groups present in the film-forming material, that the acid value of the film-forming material is less than 20 mg KOH/g, more preferably less than 10 mg KOH/g and still more preferably less than 5 mg KOH/g. Preferably the film-forming material is substantially free from ionic charges. Although the dispersion of film-forming material in aqueous medium must be stable at a pH greater than 3.9 it is preferable that it is stable at a pH greater than 5.

Non-ionic hydrophilic moieties which may be present in the structure of the film-forming material or in a non-ionic surfactant associated with the film-forming material include moieties derived from poly(ethylene glycol), also referred to as polymers of ethylene oxide; copolymers of ethylene oxide, eg. poly(ethylene oxide)/poly (propylene oxide) copolymers; partially or completely hydrolised polymers of vinyl acetate, eg. poly(vinyl alcohol); poly(vinyl pyrrolidone and poly(-meth)acrylamide, all of which moieties are solvatable by water. These materials, of course, may be useful non-ionic surfactants in their own right.

Suitable film-forming materials useful in the invention include natural oils, modified natural oils and synthetic oils such as linseed oil, linseed stand oil, paraffin oil; synthetic resins such as alkyd resins, oil-modified alkyd resins, polyurethane resins, epoxy resins, resins based on addition polymers (eg. polymers or copolymers of styrene such as styrene/butadiene, petroleum resins (eg. poly(isobutylene)), nitrogen resins (such as melamine-/formaldehyde & urea/formaldehyde), and phenolic resins.

Preferably the dispersion in aqueous medium to be used in the process of the invention comprises at least 4% by weight of film-forming material and more preferably the dispersion comprises at least 10% by weight of film-forming material.

When a non-ionic hydrophilic moiety is desired to be present in the structure of the film-forming material for example a moiety derived from poly(ethylene glycol) or poly (vinyl alcohol) it may be introduced by conventional methods, for example by esterification, by etherification, or by block or graft polymerisation. In one example, moieties of poly(ethylene glycol) may be introduced into a carboxyl group-containing alkyd resin by esterification of the alkyd resin with poly(ethylene glycol). Usually it will be necessary for the film-forming material to contain at least 1% of the non-ionic hydrophilic moieties to effect a stable dispersion.

When a non-ionic hydrophilic moiety providing the non-ionic stabilisation of the dispersion of the film-forming material is present in a distinct surface-active component of the dispersion which is associated with the film-forming material, the surface-active material will normally comprise one or more such non-ionic hydrophilic moieties. Suitable non-ionic hydrophilic moieties are derived from, or the surface-active component itself may be, poly(ethylene glycol) (for example in a polymer prepared by reaction with hydroxystearic acid), poly(vinyl alcohol), a hydroxy cellulose, or other polyol. Other suitable dispersions of film-forming polymer stabilised in an aqueous medium by non-ionic stabilisation which are suitable in the invention may be prepared as described in our co-pending British patent application No. 7940088 filed 20th November 1979.

In our British patent application No. 7940088 is described a process for the production of a sterically stabilised dispersion of polymer particles of a size in the range 0.1 to 10 microns in an aqueous medium, the process comprising the free radical-initiated polymerisation in the aqueous medium of one or more ethylenically unsaturated monomers at a temperature which is at least 10° higher than the glass transition temperature as hereinbefore defined of the polymer which is formed, in the presence in the aqueous medium as steric stabiliser of a block or graft copolymer which contains in the molecule a polymeric component of one type which is solvatable by the aqueous medium and a polymeric component of another type which is not solvatable by the aqueous medium and is capable of becoming associated with the polymer particles formed, the aqueous medium being a mixture comprising (a) at least 30% by weight of water and (b) not more than 70% by weight of a second constituent which is miscible with water, the nature and proportion of the second constituent being such that the mixture as a whole is capable of dissolving the monomer or monomers being polymerised to the extent of at least 3% by weight but is a non-solvent for the polymer formed, the concentration of free monomer in the polymerisation mixture being maintained throughout the process at a level such that at no time does the free monomer form a separate phase and the total amount of monomer polymerised being such that the resulting dispersion contains at least 20% by weight of polymer.

Preferably there is present in the dispersion at least 0.1% by weight based on the film-forming material of a distinct surface-active constituent when this constituent is responsible for the stability of the dispersion of film-forming polymer.

Chemical moieties which are interactive at a pH of 3.9 or less with specific hydrophilic non-ionic chemical moieties comprising the non-ionic stabilisation of a dispersion of film-forming material will be known to those skilled in the art. Particularly suitable such chemical moieties in the present invention are carboxyl groups, and carboxyl groups are interactive at a pH of less than 3.9 with hydrophilic non-ionic moieties such as those derived from poly(ethylene glycol) or poly(vinyl alcohol). Carboxyl groups may be present in a film-forming polymer to be deposited at an anode by the present process provided that they are not in such a proportion as will determine primarily the stability of the polymer in an aqueous medium. Preferably the carboxyl groups are present in a further material component of the dispersion which is preferably soluble in the aqueous medium. Preferably the carboxyl groups are present in a polymer. Suitable carboxyl group-containing polymers include polyacrylic acid; polymethacrylic acid; copolymers of acrylic acid and/or methacrylic acid with copolymerisable monomers such as lower alkyl esters and amides of (meth)acrylic acid, polymers and copolymers of itaconic acid, maleic acid and crotonic acid. Suitable non-polymeric carboxyl group-containing materials include lauric acid.

The present process is applicable to any substrate which is a conductor of electricity. Suitable substrates include ferriferous substrates, for example iron, steel, phosphated steel; zinciferous substrates, for example galvanised steel; aluminium; copper; and carbon.

In practising the process of the present invention there is employed, according to a further aspect of the invention, a stable dispersion of a film-forming material in an aqueous medium at a pH greater than 3.9, preferably at a pH greater than 5 and more preferably at a pH in the range 6–9, wherein the film-forming material is stabilised by non-ionic stabilisation as herein defined which comprises a non-ionic hydrophilic moiety, there being also present in the dispersion chemical moieties which are contained in a further material constituent of the dispersion and/or in the structure of the film-forming material which are interactive with the non-ionic hydrophilic moiety to cause instability of the dispersion at a pH of 3.9 or less. The preparation of such stable dispersions will be well understood by those skilled in the art.

The substrate to be coated is immersed as an anode in the dispersion and electrical current is passed for a suitable period of time and under such conditions as will provide a desired thickness and type of coating. The thickness of the coating may be controlled, for example, by the quantity of electricity passed; the concentration of film-forming polymer; and the concentration of hydrophilic non-ionic moieties and of the interactive moieties. A wide range of electrical conditions may be employed. The coated substrate may be rinsed and subsequently dried and heated to an elevated temperature.

The stable dispersions may contain other ingredients, not already mentioned, which are used in the art of coating, for example pigments, fillers, anti-corrosive agents, cross-linking agents and other polymer-modifying materials. The process may be made continuous by passing a series of substrates to be coated through a bath containing the stable dispersion described above, and replenishing the bath ingredients as they are consumed by a suitable replenishment concentrate similar in composition to that of the dispersion described above.

The invention is illustrated by the following Examples in which parts and percentages are by weight unless otherwise stated.

EXAMPLE 1

This Example illustrates the deposition of a coating of paraffin oil on steel and aluminium anodes, using an emulsion of paraffin oil stabilised by a non-ionic surfactant.

100 parts of a paraffin oil (commercially obtainable as "liquid paraffin") were emulsified in 500 parts of distilled water in the presence of 5 parts of a polymer prepared by condensing 62 parts of polyethylene glycol of molecular weight 4000 with 38 parts of hydroxystearic acid.

(a) To the emulsion was added 1 part of a 16% solution of a polymethacrylic acid in water. The polymethacrylic acid had been made by polymerising a solution of 16 parts of methacrylic acid in 100 parts of water in the presence of ammonia and ammonium persulphate as initiator. Aqueous ammonia was added to produce a pH 9 in the emulsion and an electrical current was passed between a steel anode and a counter electrode immersed in the emulsion at 100 volts for 3 minutes. An even adherent coating of paraffin oil was obtained on the steel anode.

(b) When 0.1 part of the 16% solution of polymethacrylic acid used above was added to another sample of the emulsion at pH 6 an even adherent coating of paraffin oil was obtained on an aluminium anode at 100 volts over 3 minutes. A similar result was obtained when aqueous ammonia had been added to the emulsion to give a pH of 9.

EXAMPLE 2

This Example illustrates the importance of the presence of both a suitable carboxyl group-containing material and a suitable interactive non-ionic hydrophilic moiety in a surface active material associated with a film forming material free from carboxyl groups in order to perform the present invention with paraffin oil.

(a) 100 parts of paraffin oil were emulsified in 400 parts of distilled water in the presence of a polyvinyl alcohol (commercially obtainable as "Gohsenol" GH17 from British Traders and Shippers), 0.25 part of the 16% solution of polymethacrylic acid prepared in Example 1 (concentration of polymethacrylic acid) were added to the emulsion. The pH of the stable emulsion was adjusted to 6. A heavy coating of paraffin oil was obtained on an aluminium anode immersed in the emulsion by passing an electrical current between the anode and a counter-electrode at 180 volts for 3 minutes.

(b) 0.25 part of the 16% polymethacrylic acid solution made in Example 1 was dissolved in 400 parts of distilled water, the pH of the solution being 6, and an electrical current was passed at 180 volts for 3 minutes between an aluminium anode and a counter-electrode immersed in the solution. There was no visible adherent coating on the anode.

(c) Paraffin oil could not be emulsified in water in the presence of only polymethacrylic acid.

(d) An emulsion of pH 7 in range 6–7 was prepared as in (a) but the polymethacrylic acid was omitted. No visible adherent coating was observed on an aluminium anode when an electrical current was passed at 180 volts for 3 minutes.

EXAMPLE 3

This Example illustrates the deposition of linseed oil on an aluminium substrate.

(a) 100 parts of linseed oil were emulsified in 400 parts of distilled water in the presence of 2 parts of the polyethylene glycol/hydroxystearic acid condensation polymer used in Example 1. 2 parts of a 5% solution of a polymethacrylic acid (as made in Example 1) were added to the emulsion and the pH adjusted to 9. An adherent coating of linseed oil was obtained on an aluminium panel as anode when an electrical current was passed between the panel and a counter-electrode for 3 minutes at 210 volts. (Initial deposition current was 0.8 amps falling to 0.05 amps at the end of the 3 minutes).

(b) An emulsion of 2 parts linseed oil in 400 parts distilled water was prepared in the presence of 2 parts Gohsenol GH17 (see Example 2) 2 parts of a 6% polymethacrylic acid solution in water was added and an adherent coating film was deposited on an aluminium anode at 240 volts over 3 minutes (Initial current 0.85 amps; final current 0.09 amps).

EXAMPLE 4

This Example illustrates the deposition of linseed stand oil on various substrates.

(a) An emulsion of 100 parts linseed stand oil of viscosity 5 poise was prepared in 400 parts distilled water in the presence of 5 parts of the polyethylene glycol/hydroxystearic acid condensation polymer of Example 1. 2 parts of a 6% solution of polymethacrylic acid (made as in Example 1) were added to the emulsion followed by ammonia to give a pH of 7. An adherent film of linseed stand oil was deposited on an anode of phosphated steel when electric current was passed at 240 volts over 3 minutes.

(b) A similar result to that obtained in (a) was also obtained when the anode was of aluminium.

(c) A similar result to that obtained in (a) was also obtained when the anode was of carbon.

(d) A similar result to that obtained in (a) was also obtained when the polymethacrylic acid was replaced by an equimolar proportion of polyacrylic acid.

EXAMPLE 5

This Example illustrates the use of (a) a methacrylic acid copolymer and (b) a maleic anhydride copolymer as the carboxyl group-containing material.

(a) To the emulsion described in Example 4(a) was added 1 part of a 3% aqueous solution of Rohagit SLV (a 35/65 copolymer of methyl methacrylate/methacrylic acid commercially available from Rohm & Haas) instead of the polymethacrylic acid to give an emulsion of pH 9. A phosphated steel anode was coated with an adherent coating of linseed stand oil when an electrical current was passed.

(b) To the emulsion described in Example 4(a) was added 1 part of a 20% aqueous solution of a styrene-maleic anhydride copolymer instead of the polymethacrylic acid to give an emulsion of pH 9. A phosphated steel anode was coated with an adherent coating of linseed stand oil when an electrical current was passed.

EXAMPLE 6

This Example illustrates the deposition of an unsaturated alkyd resin at various types of anode and the effect of including a metal drier salt, pigment and cross-linking agent.

(a) 100 parts of an alkyd resin prepared from the ingredients pentaerythritol/glycerol/polyethylene glycol of a molecular weight 600/tall oil fatty acids/trimellitic anhydride=1/1/2/5/2 molar were emulsified in 400 parts of distilled water in the presence of the condensation polymer described in Example 1(a). To the emulsion was added 1 part of 6% solution of polymethacrylic acid, the emulsion pH being 6. A steel panel (6"×2") as anode was coated with alkyd resin when an electric current was passed for 3 minutes at 140 volts with resin. The initial current was 0.5 amps and the final current was 0.02 amps, 18 coulombs of current having been passed.

(b) In a similar experiment to (a) 1 part of a 6% solution of lead naphthenate in white spirit was emulsified together with the alkyd resin. The coated steel panel produced after passing the electric current was rinsed and left to dry.

(c) A similar result to that obtained in (a) was achieved when using an aluminium anode.

(d) A similar result to that obtained in (a) was achieved when using a carbon anode.

EXAMPLE 7

This Example illustrates the effect of a material comprising interactive moieties, in aiding destabilisation of a sterically stabilised film-forming material.

A dispersion in aqueous medium of an addition polymer comprising styrene/methyl methacrylate/hydroxypropyl methacrylate/n-butoxy acrylamide=1/1/1/1, stabilised by a surfactant comprising a moiety of poly-(ethylene glycol) of molecular weight 2000, and prepared as described in our pending British patent application No. 7940088 filed 20th Nov. 1979, was diluted with distilled water to give 20% non-volatile material in dispersion. 800 parts of the above dispersion was divided into two equal portions, A and B.

A.

1. To 400 parts sample A 8 parts of a 16% by weight solution of polymethacrylic acid solution (prepared as in Example 1) were added. The polymer dispersion remained stable at pH 3.9.
2. 20 g of sample A1 were further acidified with HCl to a pH 2. Flocculation of the dispersion occurred.
3. A steel panel was immersed as an anode in a sample of A1. When electric current was passed between the steel panel and a counter-electrode at 200 volts a thick, heavy coat of the dispersed polymer deposited after 1 minute.

B.

1. 20 g of portion B were acidified with HCl to pH 2. The polymer dispersion remained stable, no precipitation taking place.
2. On immersing a steel panel as an anode in sample B1 and passing electrical current at 200 volts for 1 minute no deposition at the anode was observed.

EXAMPLE 8

A white non-ionically-stabilised paint was prepared comprising:

| | | |
|---|---|---|
| Titanium dioxide | 72 parts | ground to form a millbase A |
| Polyethylene glycol (PEG)-containing alkyd* | 9.2 parts | |
| White spirit | 18.8 parts | |

*(described in Example 6).

To 63 parts of millbase 'A' were added: 88 parts PEG-alkyd, 30 parts of a commercially available melamine/formaldehyde resin and 2 parts of the polyethylene glycol/12-hydroxystearic acid polymer used in Example 1, to produce a white paint 'B'.

To 183 parts of paint 'B' were added 400 g of distilled water containing 1 g of a 6% polymethacrylic acid solution in water. The pH was adjusted to 6.

The mixture was emulsified by mechanical agitation using a "silverson" homogeniser.

The above emulsion was electrodeposited in a conventional apparatus using a steel panel as anode.

6.5 g of dry paint (after stoving for ½ hour at 180° C.) were found to have been deposited by 22 coulombs of electricity at an applied voltage of 140 V.

EXAMPLE 9

A dispersion in an aqueous medium of a 60/40 methyl methacrylate/2-ethylhexyl acrylate copolymer was prepared by the procedure of our copending British patent application No. 7940088 filed 20th Nov. 1979, and in a similar manner to the dispersion of Example 7 except that the moiety of poly(ethylene glycol) was replaced by a moiety of poly(vinyl pyrrolidone) of molecular weight 1600. To 50 parts of the dispersion (60% non-volatile solids) was added 364 parts of distilled water and 1.5 parts of poly(methacrylic acid) (8% non-volatile solids solution in water) and the pH adjusted to 7.2. An adherent film of the copolymer was obtained on a steel panel as anode after passing electric current for 2 minutes at 100 volts.

EXAMPLE 10

The epoxy groups of an epoxy resin commercially available as "Epikote" 1004 were substantially hydrolysed in the presence of acid and the resulting hydroxyl groups were ethoxylated using ethylene oxide to give a poly(ethylene oxide) content of 70%. 20 parts of the thus ethoxylated epoxy resin were mixed with 50 parts of another epoxy resin commercially available as "Epikote" 828. The resin mixture was emulsified in 270 parts of distilled water, and 1.5 parts of an 8% aqueous solution of poly(methacrylic acid) in ammoniacal water were added, the pH being 7.3. A coating was deposited on a steel anode by passing electric current for 2 minutes at 100 volts.

EXAMPLE 11

50 parts of a solution of poly(methyl methacrylate) (consisting of a 40% solids content solution in a 70/30 mixture of toluene and methyl isobutyl ketone) were mixed with 21 parts of a solution of a 40/60 methyl methacrylate/poly(ethylene glycol molecular weight 750) methacrylate graft copolymer (consisting of a 30% solids solution in toluene) and 300 parts of distilled water, and the mixture emulsified. 3 parts of an 8% aqueous ammoniacal solution of poly(methacrylic acid) was added, the emulsion pH being 7.2. 7.3 parts of polymer was deposited as a film on a steel anode after 2 minutes at 100 volts.

EXAMPLE 12

50 parts of a phenol/formaldehyde resin (commercially available as "Uranol" L9 from Ciba-Geigy) were emulsified in 300 parts of water with 20 parts of the 40/60 methyl methacrylate/poly(ethylene glycol) methacrylate copolymer of Example 11, and 1.5 parts of an 8% aqueous ammoniacal solution of poly(methacrylic acid) added. The resin was deposited as a film on a steel anode after 2 minutes at 100 volts.

EXAMPLE 13

An aqueous dispersion was prepared by mixing and emulsifying in 300 parts of water, 40 parts of an epoxy resin (commercially available as "Epikote" 1004) which was esterified with linseed oil fatty acids, 10 parts of a phenol/formaldehyde resin (commercially available as "Uranol" L9) and 10 parts of an ethoxylated epoxy resin similar to that used in Example 10 except that the poly(ethylene oxide) content was 60%. 1.5 parts of an 8% aqueous solution of poly(methacrylic acid) was added and the dispersion deposited as a film on an anode at 100 volts over 2 minutes.

EXAMPLE 14

192 parts of the epoxy resin esterified with linseed oil fatty acids used in Example 13 were mixed with 8 parts of the alkyd resin described in Example 6 and the mixture emulsified in 800 parts of distilled water. 1.5 parts of an 8% aqueous solution of poly(methacrylic acid) was added, the pH being about 7.

A coating (A) was deposited on a bare steel anode of area 40 square inches from this emulsion by passing 100 coulombs at 100 volts. After stoving at 165° C. for 30 minutes 1 g of resin was found to be deposited.

A coating (B) was deposited under the same conditions (i.e. to give 1 g of stoved resin on the panel) using an emulsion of a commercially available non-pigmented epoxy ester carboxyl group-containing resin dispersed in the presence of alkali and recommended for application to an anode by electrodeposition.

Both coatings (A) and (B) were tested by the recognised procedure of "scribing" the coated panels 1 inch from their edges with two parallel scratches and subjecting them to a salt-spray treatment. After 6 days exposure panel (A) only had slight rusting whereas panel (B) showed bad blistering and rust under cut. After 11 days (A) had some rust under cut and blistering but panel (B) had failed due to severe rust under cut.

EXAMPLE 15

A resin was prepared by reacting 112 parts of an epoxy resin (commercially available as "Epikote" 1004) 10.6 parts of a dimer fatty acid (commercially available as "Epikote" 1024), 120 parts of carboxyl group-terminated poly(ethylene glycol) of molecular weight 2000, 200 parts of toluene and 0.4 part of an amine catalyst ("Armeen" DMCD) to a zero acid value.

200 parts of this resin were mixed with 40 parts of the ethoxylated epoxy resin described in Example 10 and 30 parts of a methoxy melamine/formaldehyde resin (commercially available as "Cymel" 301) and the mixture emulsified in 900 parts water to which was added 2 parts of an 8% ammoniacal solution of acrylic acid. A film was deposited on a steel panel as an anode after 2 minutes at 100 volts.

EXAMPLE 16

60 parts of acrylamide and 40 parts of methyl methacrylate were copolymerised in a mixture of 315 parts of isopropanol and 315 parts of distilled water in the presence of 3 parts of azodiisobutyronitrile. The turbid, viscous product had a solids content of 13.7%.

40 parts of the above product were added to 50 parts of a solution of polymethylmethacrylate in a 70/30 mixture of toluene/methyl isobutylketone (40% solids content) and emulsified in 300 parts of water. To this emulsion was added 1.5 parts of the 8% solution poly(methacrylic acid) used in the previous Examples. A film was deposited on an anode immersed in the emulsion when current was passed for 30 seconds at 200 volts.

We claim:

1. In a process of coating an electrically conductive substrate with a film-forming material wherein the substrate is immersed as an anode in a dispersion of the film-forming material in an aqueous medium and an electrical current is passed between the anodic substrate and a counter-electrode in electrical contact with the dispersion for a sufficient period of time to form a coating of desired thickness, the improvement characterised in that:
   (a) the film-forming material is stabilised in the aqueous medium at a pH of greater than 3.9 by non-ionic stabilisation,
   (b) the film-forming material is substantially free from ionic charges or contains and/or is associated with only an amount of ionic charges such as will not alone primarily determine the stability of the dispersion, and
   (c) the dispersion also contains a chemical moiety, which is present in a further material constituent of the dispersion and/or in the film-forming material, which moiety is interactive with a non-ionic hydrophilic moiety providing the non-ionic stabilisation of the dispersion of film-forming material, the interaction between the moieties causing destabilisation and flocculation or precipitation of the dispersed film-forming material at a pH of 3.9 or less.

2. A process according to claim 1 wherein the film-forming material is associated with a distinct surface-active constituent of the dispersion which comprises a non-ionic hydrophilic moiety.

3. A process according to claim 1 wherein the non-ionic hydrophilic moiety is polymeric.

4. A process according to claim 3 wherein the polymeric non-ionic hydrophilic moiety is derived from a polymer selected from the group consisting of polymers and copolymers of ethylene oxide; at least partially hydrolysed polymers of vinyl acetate; polymers of vinyl pyrrolidone; and polymers of (meth) acrylamide.

5. A process according to claim 1, wherein the film-forming material is selected from the group consisting of an oil or a synthetic resin.

6. A process according to claim 1, wherein the chemical moiety interactive with a non-ionic hydrophilic moiety providing the non-ionic stabilisation of the film-forming polymer is a carboxyl group.

7. A process according to claim 1, wherein the further material constituent of the aqueous dispersion containing the moiety interactive with the non-ionic hydrophilic moiety is polymeric.

8. A process according to claim 1, wherein the further material constituent of the dispersion comprises a plurality of interactive moieties.

* * * * *